April 27, 1954     L. J. LIEBERMAN     2,676,393
PROCESS FOR MAKING CLAD METAL
Original Filed March 29, 1949     7 Sheets-Sheet 6

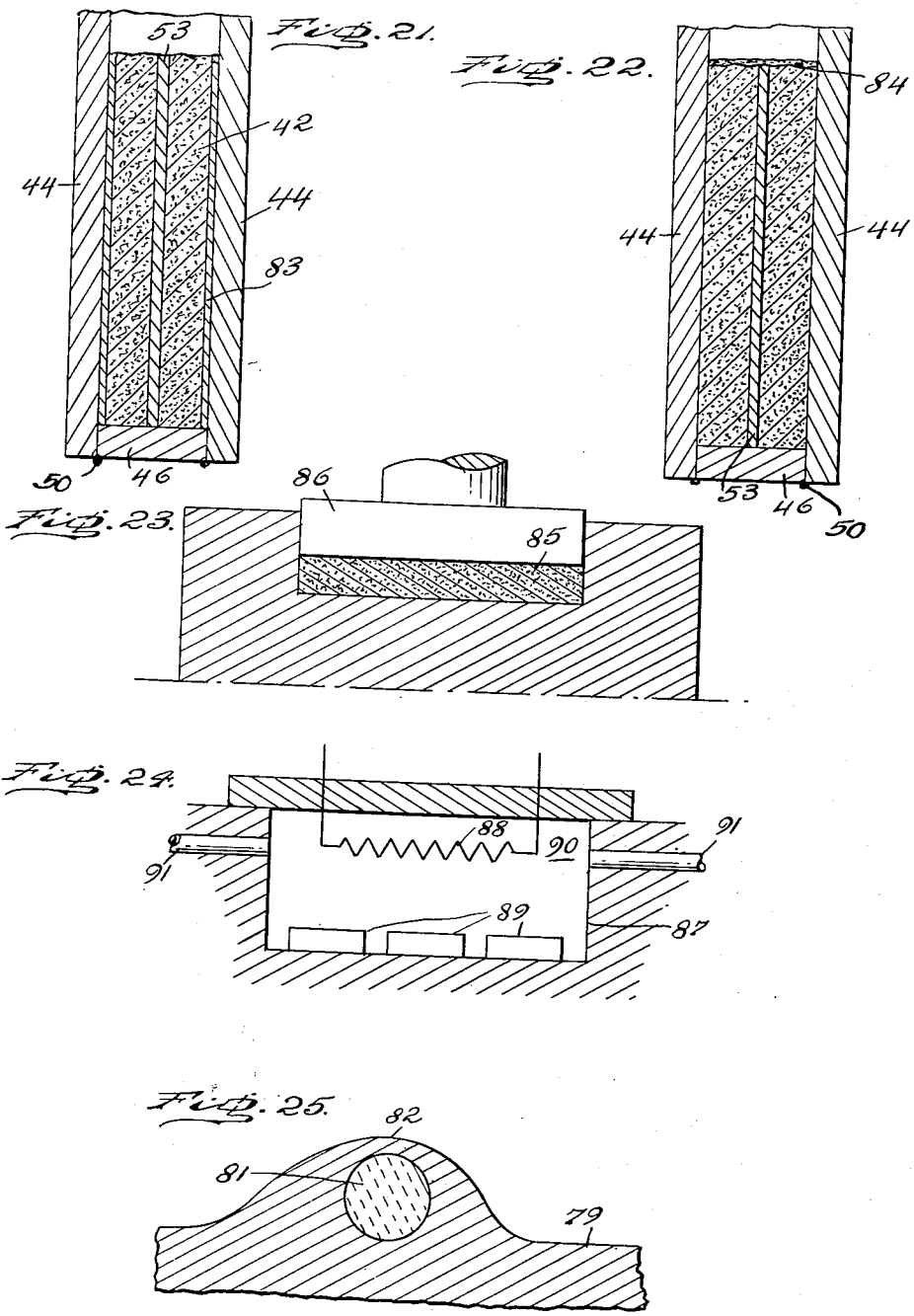

INVENTOR
Leon J. Lieberman
BY
ATTORNEYS

April 27, 1954 L. J. LIEBERMAN 2,676,393
PROCESS FOR MAKING CLAD METAL
Original Filed March 29, 1949 7 Sheets-Sheet 7

INVENTOR
Leon J. Lieberman
BY
ATTORNEYS

Patented Apr. 27, 1954

2,676,393

UNITED STATES PATENT OFFICE 2,676,393

PROCESS FOR MAKING CLAD METAL

Leon J. Lieberman, Philadelphia, Pa.

Original application March 29, 1949, Serial No. 84,173, now Patent No. 2,626,458, dated January 27, 1953. Divided and this application May 24, 1950, Serial No. 163,975

2 Claims. (Cl. 29—189)

The present invention relates to the manufacture of clad metal.

The present application contains subject matter divided from my application Serial No. 5427, filed January 30, 1948, now Patent No. 2,626,457 issued January 27, 1953, for Clad Metal which contains claims on one type of composite and from my application Serial No. 84,173, filed March 29, 1949, now Patent No. 2,626,458 issued January 27, 1953, for Clad Metal which contains generic process claims and claims on another species of the process. My application Serial No. 163,976, filed May 24, 1950, for Clad Metal contains claims on a composite of the character used in the present process.

A purpose of the present invention is to simplify and facilitate the incorporation of non-homogeneous ingredients such as abrasive in the surface layers of clad metals, or produce plates or sheets made up entirely of metal mixed with non-homogeneous ingredients such as abrasive.

A further purpose is to permit the rolling of layers of metal particles which initially exhibit little ductility without the development of serious cracks and breaks in the work under the rolls.

A further purpose is to partially assemble the composite, to insert weldable metallic particles with or without abrasive through a lateral opening near the top of the composite when it is standing on edge, to close the lateral opening, to heat the composite to hot rolling temperature and to roll the composite.

A further purpose is to partially assemble the composite, providing a lateral opening, to insert the metallic particles with or without abrasive through the lateral opening, to close the lateral opening and to roll the completed composite at hot rolling temperature.

A further purpose is to partially assemble the composite with openings in one lateral face, to vibrate the composite and concurrently to insert metallic particle with or without abrasive into the composite during vibration.

A further purpose is to accomplish the compacting, welding, bonding, reduction in thickness and sintering of powder metal layers by hot rolling, while protecting against breakage throughout the rolling operation.

A further purpose is to clean one side of each of two weldable or fusible metallic backings, apply a layer of weldable or fusible metal particles to the clean side of each backing, bring the backings together with the layers between them and separate from one another, join the backings around the edges to make composites, soak the composites at hot rolling temperature, and hot roll the composites to eliminate porosity in the layers, weld the metal particles of each layer, bond each layer to its backing and reduce the thickness.

A further purpose is to make up the particle layers of a mixture of weldable or fusible metal particles with abrasive or refractory non-metallic particles.

A further purpose is to make the backing and permissibly also the metallic particles of constructional iron alloy containing not over 0.55 percent carbon.

A further purpose is optionally and preferably to employ the layers of particles in the composites in loose uncompacted form.

A further purpose is to employ a backing of stainless steel preferably with nickel metallic particles on the face, with or without abrasive.

A further purpose is to employ nickel metallic particles preferably on a steel backing.

A further purpose is to employ metallic particles and desirably also a backing of copper base alloy.

A further purpose is to employ metallic particles and desirably a backing of aluminum alloy.

A further purpose is to employ metallic particles and desirably a backing of magnesium alloy.

A further purpose is to use particles which range between 6 and 100 mesh per linear inch for the abrasive and between 6 and 300 mesh per linear inch or finer for the metal particles.

A further purpose is to employ between 2 and 50 percent, preferably between 10 and 30 percent, of abrasive in the abrasive layer.

A further purpose is to use an abrasive containing layer which comprises from 5 to 80 percent of the total plate or sheet thickness.

Further purposes appear in the specification and in the claims.

In the drawings I have chosen to illustrate a few only of the various embodiments in which my invention may appear, choosing the forms shown from the standpoints of convenience in illustration, satisfactory operation and clear demonstration of the principles involved.

Figure 1 is an enlarged diagrammatic section of the metal particles employed in the layers.

Figure 2 is an enlarged diagrammatic section of the abrasive particles which are used.

Figure 3 is an enlarged diagrammatic section of the mixture of metal particles and abrasive particles which is employed.

Figure 4 is a diagrammatic axial section of a rotary mixer in which the mixing may be accomplished.

Figure 5 is a top plan view of one of the backings looking at the clean side.

Figure 6 is a side elevation of Figure 5.

Figure 7 is a top plan view of a parting sheet.

Figure 8 is a side elevation of Figure 7.

Figure 9 is a top plan view of the composite of the invention at the time of filling, omitting the funnel.

Figure 10 is a side elevation of the composite of Figure 9 after the final rim bar has been inserted.

Figure 11 is an end elevation of Figure 9 showing the funnel applied for filling.

Figure 12 is a diagrammatic end elevation showing the preferred procedure for introducing the particles into the composite.

Figure 13 is a diagrammatic side elevation of the vibrating table of Figure 12, omitting the other structure.

Figure 14 is a top plan view of a composite similar to that of Figure 9, but illustrating a variation.

Figure 15 is an inverted side elevation of the rim bars and parting sheet of Figure 9, showing the manner of attaching the parting sheet, but illustrating a variation in the arrangement of the rim bars.

Figure 16 is an edge elevation of a completed composite.

Figure 17 is a fragmentary edge elevation of a variation in the composite.

Figure 18 is a diagrammatic vertical sectional view of a soaking pit in which the composite has been placed.

Figure 19 is a diagrammatic edge elevation of a composite undergoing hot rolling.

Figure 20 is a diagrammatic fragmentary plan view of a completed composite which is rolled down and is about to be trimmed around the edges as shown.

Figure 21 is a diagrammatic vertical section of a composite which has been filled with particles and which illustrates the application of a flux.

Figure 22 is a diagrammatic vertical section of a composite which has been fillted with particles and which illustrates the application of a deoxidant.

Figure 23 is a fragmentary diagrammatic vertical section showing pressing of particles.

Figure 24 is a diagrammatic central vertical sectional view of a sintering furnace.

Figure 25 is an enlarged diagrammatic transverse section of the complete composite showing the mounting of a single abrasive particle.

In the drawings like numerals refer to like parts throughout.

Figure 26:
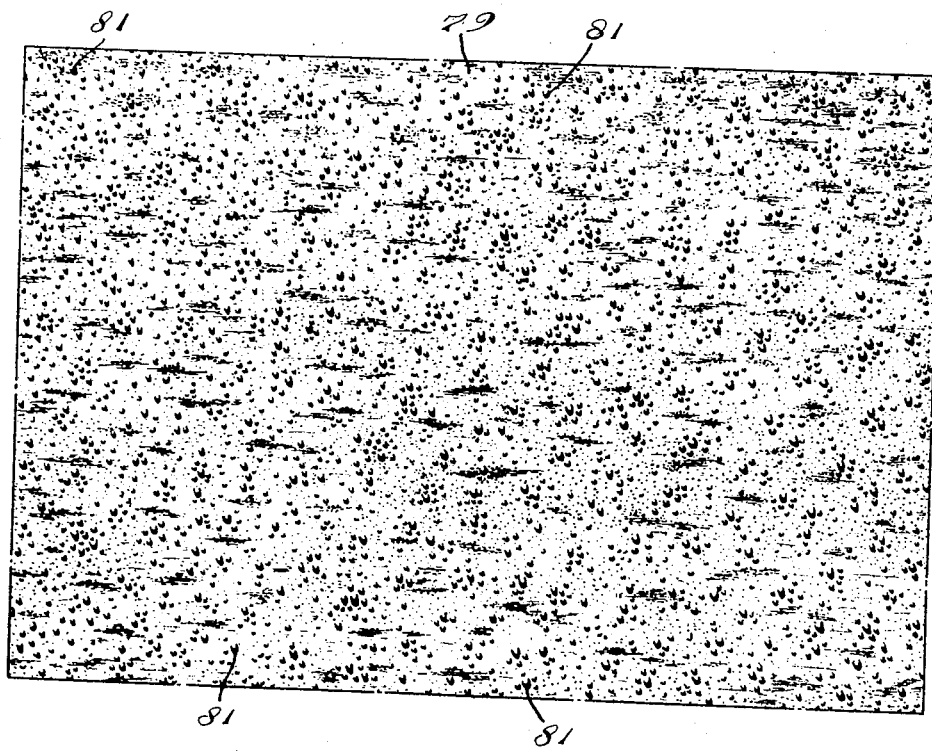
Figure 26 is a top plan view of the completed composite showing the abrasive surface.

In the prior art efforts have been made to produce floor plate and the like in which non-homogeneous particles such as abrasive (including refractory) are distributed or embedded in metal, by casting molten metal around the abrasive particles and employing the product in the form as cast. Difficulty has been encountered because of the tendency of the abrasive or the like to segregate due to difference in specific gravity and because of the limited utility possessed by the structure when used in the "as cast" form.

Efforts have also been made in the prior art to apply a layer of metallic particles, for example a bearing layer, on a backing strip, and to apply rolling pressure directly to the layer and strip. The ability to reduce the thickness of the section has been limited to campacting of the particles, as the application of substantial rolling pressures as employed in hot rolling has not been possible without breakage of the layer of particles due to the limited ductility.

By the present invention it has been possible to obtain clad metals which can undergo normal reductions in hot and in some cases in cold rolling and permit the production of sheet and plate having rolled clad layers containing non-homogeneous ingredients such as abrasive, and having the properties in the backings normally secured in similar hot and cold roller metals. It is likewise possible by the invention to obtain any convenient alloy or composition in the clad layer, without the difficulty which is otherwise encountered in rolling clad materials of dissimilar characters.

The layer which is incorporated by cladding will suitably mainly comprise powdered metal which is capable of welding to itself and to the backing layer. For many purposes the composition of the particle layer to be applied on the backing will be constructional iron alloy containing not over 0.55 percent carbon, such as iron of practically carbonless grade, low carbon steel (for example 0.01 to 0.20 percent carbon), medium carbon steel (0.20 percent carbon to 0.55 percent carbon), or low alloy weldable steel (1 to 5 percent total of hardenability alloying ingredients including any one or more of nickel, chromium, manganese, molybdenum, vanadium, silicon, and the like) containing carbon up to 0.35 percent nominal. All of these materials will have the usual metalloids and residual or intentional alloy ingredients which are commonly employed in constructional iron and steel.

Likewise the powdered metal may be of the copper base alloy type, such as copper, brass, bronze, beryllium copper, or the like. (For example, any alloys in ASTM specifications B19–49T, B36–49T, B96–49, B97–49, B103,49, B121–49T, B122–49T, B130–49T, B152–49T, B169–49T, B171–49T, B194–49T, and B195–49T may be used.) Also the powdered metal may be of the nickel alloy type, such as pure nickel, Monel, K Monel, Inconel, or the like. (For example, any alloys in ASTM specifications B39–22, B127–49T, B151–49T, B163–49T, B164–49T, and B165–49T may be used.) Where the base metal is of suitable character to weld or fuse therewith the metal particles may also be of aluminum or aluminum base alloy. (For example, any alloys in ASTM specifications B24–46, B26–48T, B85–49T, B108–49T, B178–49T, B179–49T, B210–49T, B211–49T, B221–49T, B235–49T, B236–48T, B233–49 and B299–49T may be used), mangesium or magnesium base alloy (for example, any alloys in ASTM specifications B80–49T, B90–49T, B91–49T, B92–45, B93–49T, B107–49T, B199–49T, and B217–49T may be used).

In any case where the metals chosen will weld or fuse adequately with one another and with the base, mixtures of two or more of such metal powders may be employed.

The mesh sizes for the metal particles may vary considerably, particularly as plastic flow occurs under rolling conditions and the individual particles lose their identity. Good results can be obtained with mesh sizes ranging between 6 and 300 mesh per linear inch or finer, particles finer than 100 mesh per linear inch being employed if the expense is justified. For satisfactory commercial results mesh sizes between 30 and 100 mesh per linear inch are usually quite adequate.

Figure 1 shows metal particles 40 of the character that will be employed.

The abrasive, where abrasive is used, will preferably be a refractory abrasive which will retain the form of discreet unmolten particles during hot rolling. For this purpose non-metallic refractory particles such as alumina, silica, magnesia, chrome iron core, zirconium dioxide and silicon carbide are very satisfactory.

The sizes of the abrasive particles for good results should range between 6 and 100 mesh per linear inch, preferably between 10 and 60 mesh per linear inch.

While certain aspects of the invention are useful without employing abrasive particles, for the manufacture of floor plates and the like it is best to employ between 2 and 50 percent of abrasive particles based upon the total of metal plus abrasive particles. For ordinary commercial purposes the most satisfactory range is between 10 and 30 percent. Unless otherwise stated, all percentages given herein are by weight.

Figure 2 shows abrasive particles 41 of the character which will be employed. No attempt is being made to show the actual contours of the particles.

The abrasive particles will conveniently be mixed with the metal particles to achieve a homogeneous mixture 42 as shown in Figure 3. While the mixing can be done by hand or by any suitable means, such as sifting together through screens, a rotary mechanical mixer 43 is most satisfactory in production.

The backing metal will initially be in the form of an ingot, billet, slab or plate of any suitable dimensions, preferably of the same general proportions as are normally employed at the beginning of hot rolling of the particular backing. Any one of the metals already referred to in reference to the metal products may be used for the backing metal provided the metal of the backing will adequately weld with the metal of the metal particle layer. For most commercial purposes the backing will be employed as a structural member, and therefore constructional iron alloy containing not in excess of 0.55 percent of carbon will be best in most cases. While carbonless iron can be used, the advantage of increased physical properties will normally lead to the use of low or medium carbon constructional steel or low alloy weldable steel of the compositions already explained in connection with the powdered metal. For special applications stainless steel as already described may be employed for the backing, as well as the copper group of alloys (copper, brass, bronze, beryllium copper and the like) or the nickel group of alloys (pure nickel, Monel, K Monel, Inconel and the like). Where the powdered layer will adequately weld therewith, the backing metal may also be aluminum or aluminum alloy or magnesium or magnesium alloy.

In the case of copper base alloys, any copper base alloy listed above for the metal particles may be used as a backing with the same or any other copper base alloy listed as the metal particles, and likewise with aluminum any aluminum base alloy listed above for the metal particles may be used as the backing with the same or any other aluminum base alloy listed as the metal particles. Correspondingly, for magnesium, any magnesium base alloy listed above for the metal particles may be used as a backing with the same or any other magnesium base alloy listed as the metal particles.

The backing 44 as shown in Figures 5 and 6 is conveniently rectangular in major dimensions and often will have a thickness in the range between 1 and 12 inches, preferably about 2 inches. A convenient size for each of the other dimensions is 10 to 96 inches or greater.

In some cases a flux may be desirable, although ordinarily it has been found by the present inventor that a flux is not necessary. The flux or bonding layer if used will vary with the nature of the metal powder and the backing metal as well known, and no attempt will be made to review all of the known fluxes or bonding layers which might be employed. With nickel and chromium alloys generally, comprising either the metal powder or the backing, when the other member is iron or steel, nickel has proved to be very satisfactory as flux. Nickel is suitable as a flux with the various grades of stainless steel. When copper base alloys forms one or both of the members to be bonded, any good bronzing flux is suitable.

Where iron or steel is to be bonded to iron or steel, particularly where one of the alloys contains substantial amounts of chromium or nickel, an electrodeposited or sprayed layer of iron or nickel may to advantage be used as a flux in accordance with Houston U. S. Patents 2,225,868 and 2,147,407, and Armstrong U. S. Patents 2,044,742 and 1,997,538.

It has been found that in most cases the use of a deoxidant is not necessary, especially as the metal powder has a large surface and comparatively large amounts of oxygen can be present without serious consequences. This is a distinct advantage of the present procedure over the prior practice of bonding a sheet to a backing layer. Where a deoxidant is used, aluminum or magnesium powder (particularly with steel), metallic calcium or sodium or a hydride such as calcium hydride may be employed to advantage.

In accordance with the present invention the powder layer is applied to the backing layer by making up composites. The mating face of the backing layer should be thoroughly cleaned and for this purpose the surface 45 to be welded or fused is preferably shot blasted. Other cleaning techniques may be used whether by mechanical abrasion for example through grit or sand blasting, or chemical removal as by pickling or electrochemical removal as by electrolytic etching. Whatever cleaning step is employed, the resulting surface should be clean and dry.

In accordance with the invention, the composites are partially completed until containers are formed which stand on edge, and the containers are filled with the metallic particles. This avoids the operation of spreading the particles over the backing which has been required when the backing and rim are filled with particles before assembling the composites, and also avoids the subsequent assembly of the backings with the particles in place.

By this new procedure it is possible to apply the parting compound on the parting sheet more economically than in prior practice since the workman does not have to exercise special care to avoid spreading it over any portion which would interfere with bonding. It has also been found that the use of the edge filling procedure markedly reduces the amount of welding and therefore reduces the cost of making up the composite. On actual experiment it has been found that the time required for filling is cut in half by the employment of edge filling, and the cost of filling is correspondingly decreased.

It is preferred to place the composite on a vibrating table or otherwise vibrate the composite during filling of the particles, in order to assure adequate compacting of the particles. It is not necessary to compact them densely, however.

The surfaces of the backing are cleaned and a rim 46 is applied, conveniently by welding, omitting one side. If substantial delay or soilage is to be involved in the technique of applying the rim, the cleaning of the backing surface 45 should be completed after applying the rim, but if the application of the rim is carefully controlled, the cleaning can be accomplished prior to the application of the rim. The rim is best made by applying side members 47 and end members 48 conveniently of rectangular cross section, suitably of the same composition as the backing, and welded or fused to the backing at 50 all around the periphery at each side except where the rim is omitted for filling. The welding may be continuous or discontinuous and no serious harm is done by slight gaps or porosity in the weld as long as there is secure anchorage between the rim and the backing. Optional vent holes 51 may be provided extending through the rim to permit escape of interior gases.

In the form as shown in Figure 9, the backings 44, suitably prepared for adhesion, are joined by a rim 46 consisting of individual bars 52 extending the full distance from one backing to the opposite backing. The individual welds joining the backing to the rim are designated 50.

A parting sheet 53 does not extend fully to the periphery of the composite but extends only to the inside of the rim and is tack welded or otherwise suitably united to the rim at the inside at points 54. The parting sheet may conveniently be a metal sheet of the same material as the backing, coated on its opposite sides or faces at 55 and 56 with a parting material which extends almost to the rim. The parting material may conveniently be a refractory such as magnesia, alumina, chrome iron ore, ferric oxide or the like, made into a paint with a vehicle such as shellac, linseed oil or turpentine and painted on and allowed to dry. The parting sheet or separator performs the function of keeping the two spaces on opposite sides of the division line apart during filling, and parting the rolled product as later explained.

While the parting coating may be applied to the parting sheet before the parting sheet is welded to the rim, this is best done after the parting sheet is welded to the rim but before the rim (three sides) is welded to the backings at 50.

Prior to filling the composite is assembled as shown in Figure 9, but the topmost rim bar 57 is omitted, thus leaving two open cavities 58 and 59 each defined by a cleaned face of a backing at one side and by a refractory coated face of the parting sheet at the other side and by the rim at the bottom and ends. The edge which is uppermost may be the longer or the shorter edge of the rectangle as preferred.

This open edge double container 60 having its open edge 61 uppermost is supported by a harness 62 (Figure 12) in upright position on a table 63 (Figures 12 and 13). The table is fulcrumed at 64 at one end and vibrated at the opposite end by cams 65 on a shaft 66 rotating in bearings 67.

To aid in filling, a funnel or hopper 68 is suitably placed above both of the edge openings of the composite, and a mass of metallic particles 69, with or without abrasive particles, is inserted through the funnel and allowed to compact in the cavities 58 and 59 of the composite under the tamping or vibrating of the table.

It is best to have the funnel 68 extend down on either side of the parting sheet, whether or not the parting sheet terminates at the inside of the rim or extends to the periphery, and therefore as shown in Figure 11, the funnel desirably has a center slot 70 for receiving the upper end of the parting sheet.

In using the end filling procedure just described, after completion of filling of the cavities 58 and 59, the top rim bar 57 is inserted and welded in the position indicated in Figure 10.

It will be evident that the major welds 50 which run around the periphery may be applied to the lateral ends and bottom before or after filling as desired, but if these major welds are not to be completed until after filling, the structure will preferably be well held together by tack welds or clamps prior to that time. When the composite is finally assembled as shown in Figures 10 and 16, it has backings on the outside with clean faces directed inwardly and toward one another, a layer of particles against each clean face and within a confining rim and a parting sheet between the respective layers which are otherwise adjoining.

In some cases it may be preferable to grip the parting sheet more firmly than is possible in the form of Figures 9, 10 and 11, and for this purpose the form of Figure 14 may be employed. In Figure 14 the parting sheet runs clear to the periphery. In this case there are two separate rim portions 46' and 46² extending over the bottom and lateral sides but the top is left off to provide access for filling. Welds in this case are required at 50 as in the form previously described and also at 71 and 72 between the rim portions and the opposite sides of the parting sheet, thus requiring more welding in the form of Figure 14. The welds 71 and 72 may substantially merge.

One advantage of the procedure of the present invention is that the parting sheet can be welded to the rim before the rim is welded to the backings, and the parting compound or coating can then be applied to both sides of the parting sheet before the parting sheet and rim is joined to the backings. This is illustrated in Figure 15 where the rim has been assembled except for one edge and the parting sheet 53 is ready to receive a coating of parting compound on both faces. The workman can readily apply this coating without special care, without the danger of inadvertently applying the coating to the backing, where of course it would be harmful.

The form of Figure 15 indicates the possibility of extending individual rim bars 47' fully to the periphery so that the rim bar or bars last inserted need not run the full width of the composite.

The composites after they are completed are then soaked at hot rolling temperature following the usual procedure for soaking preliminary to hot rolling of the metals involved.

In Figure 18 a conventional soaking pit 74 is shown containing composites 75 which are placed on edge after the manner of soaking ingots and billets. The soaking has a definite effect in partially sintering the particles together, beginning the process of uniting the particles to one another and to the backing which is carried forward and completed during the hot rolling. Where iron and steel are involved, the soaking time will preferably be from 2 to 4 hours at temperatures of 1800 to 2400° F., preferably 2000 to 2400° F. and most desirably 2250 to 2400° F. Of course, the soaking temperature must not be high enough to melt any component, and if any metallic component melts at the lower limit of the hot rolling temperature of another metallic component, the present process will not be applied to such components in such combination.

Experience has indicated that no special soaking precautions are required other than those usually indicated for the metals employed.

The composites are rolled, following the usual hot rolling procedure for the metal of the backing. For iron and steel, blooming and heavy-duty plate mills are most suitable. The hot rolling performs a number of different functions. In the first place it accomplishes a function similar to pressing, eliminating porosity and compacting the particles without the necessity and the expense and delay incident to pressing on a conventional powder metallurgy press. At the same time, as porosity is eliminated and the particles form a dense mass, the particles weld to one another and bond to the backing. Thus the action involves the effects of pressing and sintering, and also marked plastic flow which gives much more compacting than would be possible under ordinary pressing and sintering.

As in ordinary rolling practice, the work is widened and elongated, reducing to any suitable gage, for example plate thickness such as $\frac{3}{16}$, $\frac{1}{4}$ or $\frac{3}{8}$ inch, or sheet thickness such as 10 gage or lighter. Thus in a particular example, an initial area of 18 to 20 inches was increased to 40 by 100 inches during the rolling and an initial thickness of 1½ inches was reduced to $\frac{1}{16}$ inch. The abrasive containing layer will often be 5 to 80 percent of the final thickness, usually 20 to 50 percent. The hot work can be followed by cold work so far as the ductility will permit. During the first pass or first few passes, air in the interior space between the particles of the layers and in other voids escapes through the vent holes 51 already described, if they are used, but the vent holes are then pinched closed or substantially closed and no tendency is noted to draw in air during any later point in the rolling process.

The particles of abrasive go through the rolling without any tendency to segregate and are firmly held in the compacted particle layer which finally results.

Figure 27:
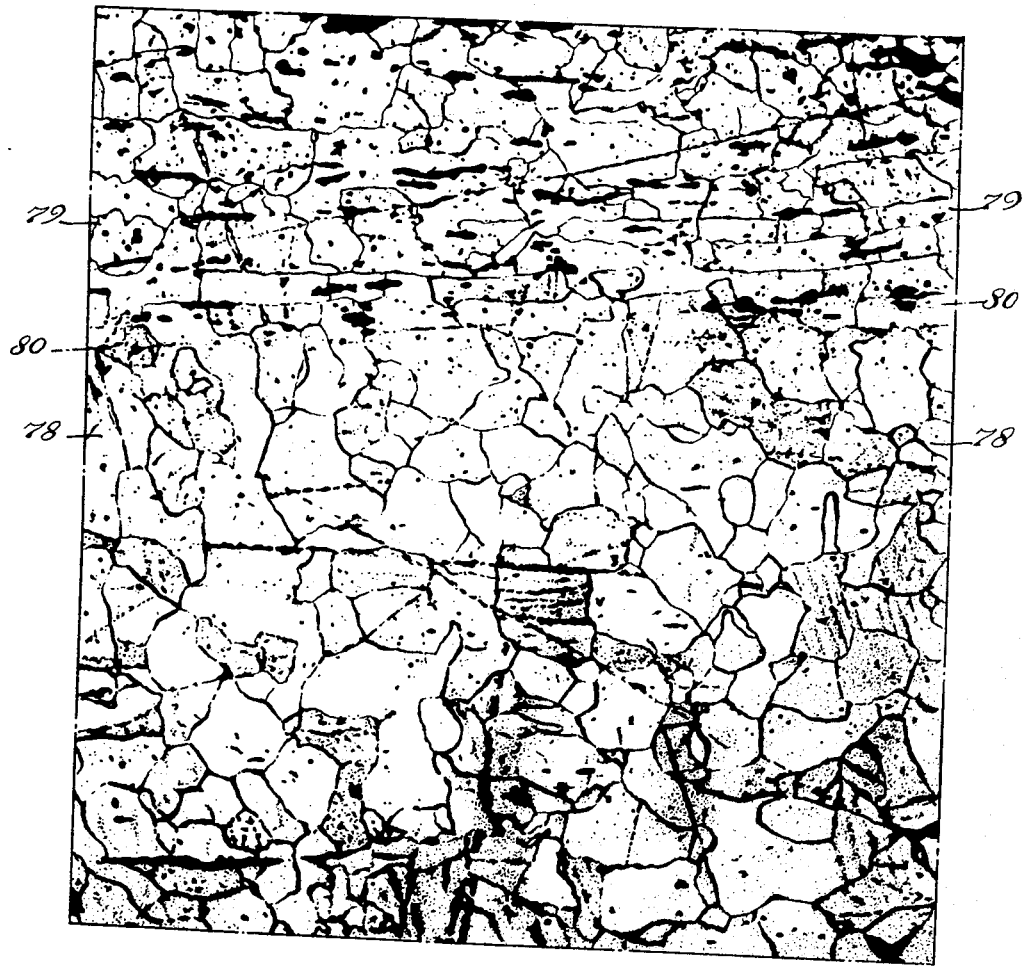
Figure 27 is an enlarged transverse sectional view showing the bond line of the clad metal.

In Figure 19 rolling mill rolls 75 are illustrated which are reducing the section at 76 to indicate one of numerous passes which may be used. Cross rolling may be employed if desired. When the product is rolled to gage, the edges are trimmed as by a shear to eliminate the edge strip 77 (Figure 20) which will be imperfect due to the rolling down of the rim and the weld beads. The individual sheets are then stripped apart, and the separator discarded. The final product consists of a backing 78 and a face cladding layer 79 thoroughly united and welded at a bond line 80 (Figure 27) and having discreet particles of abrasive 81 throughout the layer 79 and uniformly distributed over the surface as shown in Figure 26. Actually the metal tends to form a layer over the abrasive as shown in enlargement at 82 (Figure 25). Experiments indicate that the bond to the backing is excellent and the product will undergo flanging, bending and other normal forming without separation of the bond or breakage of the clad face. Unlike the cast products of the prior art, the face layer can wear clear through to the bond line without encountering any different in distribution of the abrasive or other added particles. Of course, it will be evident that where desired the particle layer may be made up of several increments with different composition, in which case the percentage of abrasive or other non-metallic ingredients may vary if desired in the direction of filling (longitudinal to the bond line).

The invention is applicable wherever clad metals are to be made, since it overcomes the difficulty in rolling dissimilar metals and permits the adding of a facing layer having disadvantageous hot rolling characteristics at the temperature required for hot rolling of the backing. Thus for such purposes the composition (of particles may be entirely metal particles without abrasive or other added material).

In most cases the invention will, however, find its best application in making floor plates, and products of this character are widely used in stairway treads and landings, floors, vestibule floors, railroad car steps, fire escape floors and steps, kitchen floors, machine and industrial walkways, and running boards for box cars.

The following may be cited as examples:

*Example I*

The backing is a plan carbon steel of AISI 1020 grade, and the particle layer consists of 80 percent of powdered steel of AISI 1010 grade and 6 to 300 mesh per linear inch and 20 percent of alumina particles of 6 to 100 mesh per linear inch.

*Example II*

Example II is the same as Example I except that the powdered abrasive is magnesia.

*Example III*

Example III is the same as Example I except that the powdered metal is commercially pure nickel.

*Example IV*

Example IV is the same as Example I except that the abrasive makes up 30 percent of the particle layer.

*Example V*

Example V is the same as Example I except that the backing is low alloy weldable steel of nominal composition 0.40 percent molybdenum, 0.50 percent nickel, 0.60 percent manganese, and 0.30 percent carbon.

*Example VI*

Example VI is the same as Example I except that the particle layer is 100 percent plain carbon steel of AISI 1020 grade.

*Example VII*

Example VII is the same as Example I except that the backing is stainless steel, nominally 18 percent chromium, 8 percent nickel, no carbon, and the powdered metal is commercially pure nickel, no abrasive being used.

*Example VIII*

Example VIII is the same as Example I except

Example IX

Example IX is the same as Example I except that the backing and the metal particles in with the abrasive both consist of bronze containing 90 percent of copper and 10 percent of tin.

Example X

Example X is the same as Example I except that the backing and the metal particles in with the abrasive both consist of commercial copper.

Example XI

Example XI is the same as Example I except that the backing and the metal particles in with the abrasive both consist of Monel.

Example XII

Example XII is the same as Example I except that the backing consists of Inconel and the particle layer consists of 100 percent of Inconel, no abrasive being used.

Example XIII

Example XIII is the same as Example I except that the backing and metal particles both consist of 24 S aluminum alloy.

Example XIV

Example XIV is the same as Example I except that the backing and metal particles both consist of magnesium alloy $M_1$ (Metals Handbook 1948).

While for many purposes it is preferred to apply the particles as loose uncompacted powder which is compacted by the rolling, to omit flux and omit deoxidant, and avoid sintering prior to soaking, these features may optionally be used in individual cases.

Figure 21 illustrates in a composite not yet closed the use of flux 83, in this case nickel plated or sprayed on the clean surface of the backing before introducing the layer 42 of metal particles usually with abrasive.

Likewise there is shown in Figure 22 the application in a composite not yet closed of a deoxidant layer 84 preferably on top of the particle layer. The deoxidant layer in this case may be aluminum powder where the particle layer consists of steel powder with abrasive.

While as already explained the rolling mill ordinarily performs the pressing function and avoids the expense of pressing, the particles may be formed at 85 (Fig. 23) into a biscuit or briquette prior to introducing them into contact with the clean surface of the backing. Where preforming is employed, the surface of the briquette which is to come into contact with the clean surface of the backing should be cleaned as by shot blasting prior to contact. Any conventional press 86 may be employed in preforming.

The preforming pressure will preferably be of the order of 1000 to 10,000 pounds per square inch. The preformed particles may also be sintered prior to making the composite if desired. A sintering furnace 87 is illustrated in Figure 24, heated electrically at 88 for sintering particle layers 89 permissibly in an inert or preferably reducing atmosphere at 90 applied through connections 91. Suitable gases are hydrogen, carbon monoxide, nitrogen, ammonia, helium or argon or mixtures thereof. The surface of the sintered layer which is to come into contact with the clean surface of the backing should be cleaned as by shot blasting before the composite is assembled.

Sintering may be accomplished with or without pressing. For the present purpose a loose mass of particles may be sintered.

While the possibility of using preformed particles has been referred to, it is decidedly preferable in the present invention to employ loose uncompacted particles which receive their only compacting prior to rolling by the tamping or vibrating action. The ability to use loose uncompacted (unpressed) particles and obtain good results is one of the great advantages of the invention.

For iron or steel the sintering temperature may range between 1200 and 1800° F. permissibly up to 2400° F. and preferably at about 1550° F. preferably for a time of one and one-half to three hours. Where an inert or reducing atmosphere is used, the layers should cool in the atmosphere.

It is expensive to employ large presses, and where preformed particles are to be used the mass of particles may be built up of several individual preformed briquettes or biscuits. It has been found that these weld perfectly along their lateral edges providing they are clean when making up the composite.

While for many purposes the most convenient form of the invention will employ two backings and two particle layers in the composite, it will be understood that any plurality of backings and layers may be used preferably in multiples of two. Figure 17 illustrates a composite made up of four backings 92, 93, 94, 95 each with a particle layer adjoining. Where the two backings 93 and 94 would otherwise be juxtaposed, an additional parting sheet 96 is applied and the edges of the backings are welded at 97.

It will be evident that by the present invention it is possible cheaply and conveniently to fabricate clad metal sheets containing non-homogeneous material such as abrasive, and to roll out, compact, weld and bond metals which otherwise are difficult to roll and impossible to reduce to thin layers as required for clad metals.

While the invention has its widest application in the making of floor plates it will be understood that the principles of the invention can be used in many of the connections where it otherwise would be difficult to unite together the particular combination of metals which is employed.

When reference is made to the particles of layer as being welded, it will be understood that they may be fused.

Percentages unless otherwise indicated are by weight.

In view of my invention and disclosure variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claims.

Having thus described my invention what I claim as new and desire to secure by Letters Patent is:

1. The process of making clad metal, which comprises mixing weldable metal particles with abrasive non-metallic particles, making up a composite comprising two spaced weldable metallic backings, a weld-resisting parting sheet intermediate between the backings in spaced relation thereto and a rim extending partially around the periphery between the backings, leaving an access opening to interior spaces of the composite at an edge, filling the space between each backing and the parting sheet with weldable metallic particles mixed with the abrasive nonmetallic particles introduced through the access opening, closing the edge access opening, soaking the composites at hot rolling temperature and hot rolling the composites to eliminate porosity in the layer, weld the metal particles of each layer, weld each layer to its adjoining backing and reduce the thickness.

2. The process of making clad metal, which comprises making up a composite comprising two spaced weldable metallic backings, having clean surfaces facing toward one another, a weld-resisting parting sheet intermediate between the backings in spaced relation thereto and a rim extending partially around the periphery between the backings, leaving an access opening to interior spaces of the composite at an edge, filling the space between each backing and the parting sheet with loose uncompacted weldable metallic particles introduced through the access opening, closing the edge access opening, soaking the composites at hot rolling temperature and hot rolling the composites to eliminate porosity in the layer, weld the metal particles of each layer, weld each layer to its adjoining backing and reduce the thickness.

References Cited in the file of this patent

UNITED STATES PATENTS

| Number | Name | Date |
|---|---|---|
| 642,157 | Russell | Jan. 30, 1900 |
| 1,469,761 | Yunck | Oct. 2, 1923 |
| 1,974,079 | Maier | Sept. 18, 1934 |
| 2,053,096 | McKay | Sept. 1, 1936 |
| 2,178,527 | Wellman | Oct. 31, 1939 |
| 2,241,095 | Marvin | May 6, 1941 |
| 2,301,332 | Sheller | Nov. 10, 1942 |
| 2,332,746 | Olt | Oct. 26, 1943 |
| 2,381,941 | Wellman | Aug. 14, 1945 |
| 2,390,452 | Mudge | Dec. 4, 1945 |
| 2,416,400 | Mehl | Feb. 25, 1947 |

FOREIGN PATENTS

| Number | Country | Date |
|---|---|---|
| 568,786 | Great Britain | Apr. 20, 1945 |